Patented Dec. 22, 1953

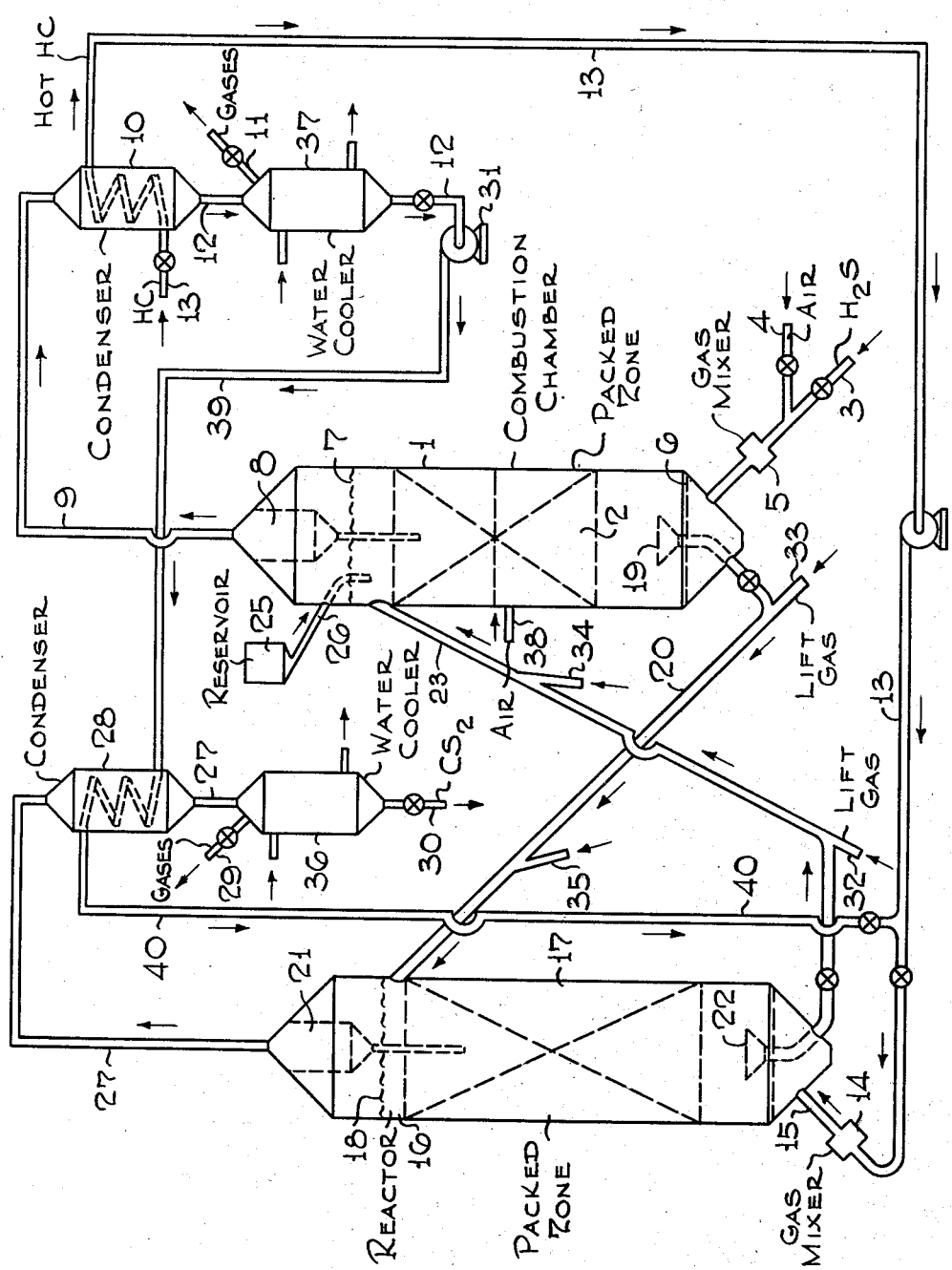

2,663,622

UNITED STATES PATENT OFFICE 2,663,622

PREPARATION OF CARBON DISULFIDE

William W. Odell, New York, and Charles E. Morrell, Westfield, N. Y., and Harold W. Scheeline, East Orange, N. J., assignors to Standard Oil Development Company, a corporation of Delaware Application December 14, 1948, Serial No. 65,264

11 Claims. (Cl. 23—206)

This invention relates to the production of carbon disulfide by reaction between sulfur vapors and hydrocarbons at high temperatures. More particularly, the invention is concerned with the reaction between sulfur vapors and hydrocarbons whereby the heat necessary for the reaction is provided by a hot catalyst which is heated and regenerated in a combustion zone wherein the sulfur for the reaction is simultaneously produced.

It is an object of this invention therefore to prepare carbon disulfide by reaction between sulfur vapors and hydrocarbons in the presence of a catalyst at high temperature.

It is another object of this invention to provide the necessary heat for the reaction by circulating to the reaction zone a finely-divided fluidized catalyst which has been raised to the reaction temperature by combustion of a sulfur-producing component in the presence of the catalyst.

To summarize the invention briefly, any economical raw material capable of yielding sulfur on oxidation without appreciable conversion to $SO_2$, e. g., hydrogen sulfide, iron pyrites, etc., but preferably hydrogen sulfide, is burned with an oxygen containing gas in a combustion chamber thus producing sulfur and generating heat by the highly exothermic reaction:

$$2H_2S + O_2 \rightarrow S_2 + 2H_2O + 106,000 \text{ calories}$$

The generated heat is immediately imparted to a catalyst, e. g., silica, alumina, tungsten sulfide, activated clays or other stable metallic sulfide catalysts, as will be enumerated below.

The sulfur is removed as a vapor, separated from other gaseous constituents such as nitrogen, $SO_2$, unconverted $H_2S$, etc., and passed in addition to the heated catalyst into a reaction zone to which is fed a vaporizable hydrocarbon such as methane, ethane, propane, etc., at a temperature of 425° C. to 1000° C., preferably about 500° C. to 750° C., thereby utilizing the sensible heat of the catalyst as well as its catalytic activity in promoting reactions which yield an outlet gas stream containing carbon disulfide. Some of the reactions occurring in the carbon disulfide-producing reactor are:

(1) $CH_4 + \text{heat} \rightarrow C + 2H_2$ (endothermic)
(2) $2S_2 + CH_4 \rightarrow CS_2 + 2H_2S$ (endothermic at 25° C.)
(3) $C + S_2 \rightarrow CS_2$ (endothermic at 25° C.)
(4) $2H_2 + S_2 \rightarrow 2H_2S$ (strongly exothermic)
(5) $2H_2S + C \rightarrow CS_2$ (liquid) $+ 2H_2$ (somewhat exothermic at 25° C.)
(6) $H_2S \rightarrow H_2 + S$ (endothermic)

The invention will be more readily understood by reference to the accompanying drawing which diagrammatically illustrates in a sectional elevational view one arrangement of apparatus for carrying out the process.

Referring now to the drawing, the numeral 1 represents a combustion chamber which contains a packed zone 2, containing packing of inert material of comparatively substantially large particle size. In the combustion chamber a sulfur-containing raw material, for example, hydrogen sulfide entering through line 3 is mixed in gas mixer 5 with air or other oxygen-containing gas entering through line 4, and the mixture of air and $H_2S$ enters the combustion chamber through perforated grid 6. Hot fluidized solid catalytic material, the source of which will be explained, is introduced into the combustion chamber via line 23, entering at a point near the top thereof. The fluidized solid builds up in the combustion chamber and reaches a level indicated by the numeral 7. In the combustion chamber the fluid-solid material is in a highly turbulent condition resembling a boiling liquid. During the combustion of the hydrogen sulfide gas, sulfur vapor is produced and considerable heat is evolved. The heat is immediately imparted to the catalytic solid which is moving downwardly through the packing of the combustion chamber to a lower portion thereof. The products of the combustion reaction which are chiefly gases containing sulfur, $SO_2$, nitrogen, hydrogen sulfide, etc., are removed from the combustion chamber via line 9 after passing through cyclone 8 wherein any solid particles are removed therefrom. The gases pass into condenser 10, and then into water cooler 37 where a temperature sufficient to condense the sulfur to the liquid state is maintained. In the cooler, the sulfur is separated from nitrogen, $H_2S$, and $SO_2$, which are removed via line 11. Any unconverted $H_2S$ and/or $SO_2$ present in the gases removed through line 11 may be further worked up to recover additional sulfur, for instance, by the use of the Claus process. The combustion gases and vapors are cooled in condenser 10 by indirect heat exchange with a vaporizable hydrocarbon stream entering through line 13. The liquid sulfur which is maintained at a temperature and under conditions which cause it to remain fluid, is removed via line 12 and pumped by means of pump 31 via line 30 to condenser 20 where it passes in indirect heat exchange with hot gases being removed from reactor 16, as will be further explained, and is reconverted to the vapor state ready for introduction into reactor 16 via line 40 with hydrocarbon gases from line 13. The hot hydrocarbon gases are blown, together with sulfur vapors, into gas mixer 14, and thence via line 15 into reactor 16.

The hot solids which have been heated to a temperature of 425° C. to 1000° C. during the highly exothermic oxidation reaction in the combustion chamber, collect in well 19 and are removed via line 20 and transported into the top of the reactor 16 to supply the necessary heat for the reaction between the sulfur vapors and the hydrocarbon. In order to prevent or minimize the carry-over of carbon from the decomposition of the hydrocarbon in the reactor, it is desirable that means be provided for a true countercurrent flow of catalyst in the reactor. This is also desirable because of the desired heat transfer from solids to the reacting gasiform materials, hence, packing is provided in packed zone 17 of the reactor. The fresh or reheated catalyst is supplied at the top of the fluidized bed indicated by the levels 18 in the reactor and is discharged at a lower temperature from well 22 adjacent the bottom of the fluid bed. More than one packed zone may be used spaced vertically apart, or substantially the entire bed may be confined in a packed zone through the interstitial spaces of which the catalyst flows downwardly. Some carbon may deposit on the catalyst in the reactor, but this is burned off subsequently in the combustion chamber 1.

An excess of sulfur vapor is preferably fed to the reactor in order to minimize the amount of methane and hydrogen in the overhead discharged reaction products leaving the reactor. A temperature of 425° C. to 1000° C., preferably about 500° C. to 750° C., is maintained in the reactor. A temperature gradient of about 750° C. at the top of the reactor bed to about 500° C. at the bottom of the reactor bed may obtain. This temperature is brought about by the relative rates of circulation of the feed reactants and the hot catalyst.

The cooled catalyst is removed from reactor 16 through well 22 and line 23, and is returned to the combustion chamber 1 entering at a point near the top thereof for further heating and regeneration. Thus the catalyst is regenerated and reheated in the combustion chamber simultaneously with the formation of the sulfur required in the process. The reaction products are removed as vapor from reactor 16 via line 27 after passing through cyclone 21 wherein any solid entrained particles are removed. The hot gases pass through condenser 28 in indirect heat exchange with the molten sulfur thereby causing vaporization of the sulfur which passes down through line 12 and mixes with the hydrocarbon entering the gas mixer via line 13. The gases then pass into water cooler 36 wherein CS2 is separated from hydrogen sulfide, mercaptans, hydrogen, unconverted hydrocarbons, etc. which leave the system via line 29. Carbon disulfide is recovered via line 30 and is sent to suitable absorbers or fractionators for further purification. Gases removed via line 29 may be further worked up for recovery of individual components therefrom, for example, hydrogen sulfide may be recovered and further converted to sulfur together with any mercaptans that may be present. Any unconverted hydrocarbon gases may be recycled or otherwise used as fuel. When the hydrocarbon conversion is relatively high and only fairly small amounts of hydrogen are present the entire stream, after removal of carbon disulfide, may be fed to the combustion chamber 1. Make-up when the solids enter the system from reservoir 25 and line 26 to combustion chamber 1.

In order to transport the solids between the combustion chamber and the reactor and vice versa, it is necessary to employ lift gas. For example, lift gas entering through line 33 assists in the transportation of the hot solids from vessel 1 to vessel 16 via line 20. Additional fluidizing gas may enter through line 35. Similarly gas entering through line 32 causes the conveyance of solids from vessel 16 via line 23 to vessel 1. Additional fluidizing gas may be added through line 34. Combustion gases in chamber 1 either before or after cooling may be employed to elevate the spent catalyst from vessel 16 through line 23 to the top of the combustion chamber 1. Similarly overhead gases from vessel 16 preferably before any cooling may be employed to elevate catalyst from combustion chamber 1 via line 20 to the top of vessel 16. The combustion chamber 1 may be located at a point above reactor so that gravity flow of solids from chamber 1 to the top of reactor 16 could be employed. In the latter case cooled gases emerging from water cooler 11 could be utilized to elevate spent catalyst from reactor 16 to the top of combustion chamber 1.

The heat requirements of the process are supplied essentially by the exothermic reaction promoted in the combustion chamber.

The reactants or at least one of them, are supplied preheated preferably by use of the heat evolved in the condensers.

*Catalyst circulation rate*

The catalyst circulation rate in the reactor should be preferably such that very little if any carbon is carried out of the reactor in the stream of gasiform reaction products. The catalyst circulation rate in the combustion chamber is such that excessively high temperatures (that is, temperatures substantially above the order of 1000° C.) do not prevail in the chamber. The sulfur formed by the oxidation of H2S in the combustion chamber is rapidly cooled by virtue of the countercurrent contact of the gas stream with the catalyst in the combustion zone. The gas velocity in the combustion zone and rate of cooling is such that sufficient time at elevated temperature does not prevail for the occurrence of the reaction:

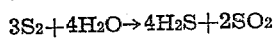
$$3S_2 + 4H_2O \rightarrow 4H_2S + 2SO_2$$

This rapid cooling and countercurrent contact with the cooled catalyst retards loss of sulfur by the above reaction.

*Velocities of gas streams*

The velocities of the gas streams through the fluidized beds in the reactor and in the combustion zone are in accordance with standard practice in the use of fluidized solids technique. If the catalyst solids are say 10 to 20 mesh, the superficial velocity of the gas stream in the bottom of the beds in reactor and combustion chamber may be about 2 to 3 feet per second. If the interstitial space in the packing, which is fixed, is rather small the diameter of the packed zones should be greater than in the zones of unlimited particle movement, otherwise particles of catalyst will not flow down through the mass of packing. The diameter of the packed zones can advantageously be 1.2 to 2.0 times the diameter of the zones of free particle motion; i. e., top or bottom zones of the reactor and combustion chamber.

Particle size of catalyst

To successfully employ catalyst at temperatures approximating 1000° C., it is necessary to employ large size particles rather than fine dust, in order to avoid sticking-together of the particles. Sizes approximating 10 to 20 mesh or 10 to 40 mesh are preferred. The use of these relatively large size catalyst particles allows employment of the desired high velocity of gas through the reaction zone in the combustion chamber.

Because prolonged duration of reaction time of carbon with sulfur or methane with sulfur is desired in the reactor, and whereas shorter duration of reaction time is desired in the combustion chamber, it is preferable that the bed in the reactor be deeper, say twice as deep or more, than that of the bed in the combustion chamber. The mean diameter of the reactor may advantageously be greater than that of the combustion chamber. A favorable occurrence is that the temperature of the gas stream passing up through the combustion chamber decreases from bottom zone to top zone while the catalyst temperature increases from top to bottom; whereas the temperature of the gas passing up through the reactor increases upwardly in the bed and the catalyst temperature decreases from top to bottom of the bed.

An unexpected result of operation is that when the temperature in the packing zone of the reactor is about 1000° C., some carbon (from hydrocarbon decomposition) tends to collect on the packing, and this carbon, which is highly reactive, reacts with the sulfur or the hydrogen sulfide, or both, by endothermic reactions. Thus carbon is continuously being deposited and reacted in the mass of packing at the surfaces thereof and the temperature is maintained therein favorable for this reaction by the downwardly flowing catalyst.

The major reaction occurring in the combustion chamber is:

$$2H_2S + O_2 \rightarrow 2H_2O + S_2$$

The reactants are proportioned in view of composition of the outlet gas so that the latter reaction is most favorably promoted.

Catalysts

Two classes of solid catalyst are suitable for the reaction. The first class consists of materials such as silica gel, silica-alumina, alumina, activated alumina, floridin, bauxite, activated bauxite, etc. These catalysts are preferred at the lower temperature ranges, namely about 425° C. to 700° C. These catalysts may be promoted with small amounts of oxides or sulfides of the metals of groups 5 to 8 of the periodic table.

The second type of catalysts suitable for the reaction are the metallic sulfides, particularly the sulfides of nickel tungsten, chromium, titanium, copper, silver, molybdenum, manganese, zinc and vanadium. It is preferred to use the metallic sulfide catalysts at the higher temperatures, namely temperatures in the range of about 700° C. to about 1000° C.

Ordinary metallic oxides are not suitable catalysts because they in part oxidize hydrogen, hydrocarbon, or sulfur in the reactor and yield undesirable reaction products which dilute the carbon disulfide. Silica and alumina are particular exceptions.

However, in one embodiment of the invention, metallic oxides may be fed to the combustion zone and converted to the catalytic metallic sulfides by the action of sulfur produced during the oxidation of the $H_2S$. Thus the combustion zone serves a three-fold simultaneous purpose, namely, (1) the production of sulfur vapor, (2) the conversion of non-catalytic metallic oxides to the catalytic metallic sulfides, and (3) the imparting of sensible heat to the metallic sulfide catalyst.

When it is desired to sulfide the catalyst in combustion chamber 1 it is preferred that air be fed partially to the gas mixer 5 and partially to the combustion zone entering at the point through line 38. The use of partial air-feed at the bottom produces an excess of hydrogen sulfide over oxygen at that point thereby assuring sulfurization of the catalyst before it returns to reactor 16. Feeding additional air further up in the combustion zone would allow for complete combustion of the hydrogen sulfide.

Temperature and pressure

The temperature employed in the reactor varies with the catalyst employed and usually falls within the range of 425° C. to 1000° C. With the clay type catalyst, lower temperatures of 425° C.–700° C. are employed, while with the metallic sulfide catalysts, a higher temperature in the range of 700° C. to 1000° C. is employed. Temperatures above 1000° C. in the reactor are to be avoided in that these high temperatures cause excessive production of hydrogen.

The pressure employed in the reactor 16 is preferably substantially atmospheric pressure, that is, only the small pressure necessary to propel the reactants through the catalyst at the desired rate of flow is employed. Pressures up to 500 pounds per square inch may be tolerated. However, when employing superatmospheric pressures it is necessary to control the temperature so that it is maintained above the temperature of condensation of sulfur in the hot vapor lines. Sub-atmospheric pressure may be employed in the reactor by maintaining the gaseous reaction products under diminished pressure.

Hydrocarbon materials

The source of carbon for the reaction may be any of the normally gaseous or vaporizable liquid compounds of the paraffin and olefin series. Natural gas, cracked gas, hydrocarbon residue, and polymers may also be employed. Hydrocarbon materials containing 2 to 4 carbon atoms are the preferred sources of carbon. However, other inexpensive sources of hydrocarbon such as residues and high-boiling fractions from thermal and catalytic cracking operations may be employed.

The preferred source of sulfur is from the combustion of hydrogen sulfide. However, other materials yielding sulfur on oxidation may be employed, for example, mercaptans, disulfides, and even iron pyrites may be used.

While the invention has been described by the use of countercurrent flow in both combustion chamber and reactor, with certain catalysts the hindered-settler type of reactor, without any kind of countercurrent action, may also be employed. This is especially true when using alumina, bauxite, clay or silica-alumina catalyst. When the latter type of reactor is employed the nature of the lift gases would be changed somewhat. Air or hydrogen sulfide or a mixture thereof would be employed to transport catalyst to the combustion chamber and hydrocarbon vapors to transport catalyst to the reaction zone.

What is claimed is:

1. In the preparation of carbon disulfide by the vapor phase reaction of sulfur with a hydrocarbon in a reaction zone in the presence of a solid catalyst at a temperature of 425° C. to 1000° C., the improvement which comprises supplying the necessary heat for the reaction by burning a combustible sulfur-containing material in an oxygen-containing gas in a combustion zone in the presence of the catalyst whereby sulfur is produced and whereby the heat of the exothermic combustion reaction is imparted to the catalyst, and passing the sulfur and heated catalyst from the combustion zone to the reaction zone in the absence of any non-catalytic heat carrying solid.

2. The method of claim 1 in which the hydrocarbon is methane, in which the combustible sulfide material is hydrogen sulfide, and in which the catalyst is silica.

3. A process for the preparation of carbon disulfide by the vapor phase reaction of sulfur with a hydrocarbon in a reaction zone in the presence of a solid catalyst at a temperature of 425° C. to 1000° C., which comprises supplying the catalyst to a combustion zone, burning a combustible sulfur-containing material in an oxygen containing gas in the combustion zone whereby sulfur is produced and whereby heat is generated and imparted to the catalyst in the combustion zone, passing vaporized sulfur to the reaction zone, passing a vaporizable hydrocarbon to the reaction zone, circulating sufficient hot catalyst from the combustion zone to the reaction zone in the absence of any non-catalytic heat carrying solid to supply the necessary heat of the reaction, and recovering carbon disulfide from the reaction zone.

4. A process for the preparation of carbon disulfide by the vapor phase reaction of sulfur with methane in a reaction zone in the presence of a metallic sulfide catalyst at a temperature of 700° C. to 1000° C., which comprises supplying the catalyst to a combustion zone, burning a combustible sulfur-containing material in an oxygen-containing gas in said combustion zone whereby sulfur is produced and whereby heat is generated and imparted to the catalyst in said combustion zone, passing vaporized sulfur to the reaction zone, passing methane to said reaction zone, circulating sufficient hot catalyst from the combustion zone to the reaction zone in the absence of any non-catalytic heat carrying solid to supply the necessary heat of the reaction, and recovering carbon disulfide from the reaction zone.

5. A process according to claim 4 in which the catalyst employed is nickel sulfide.

6. A process for the preparation of carbon disulfide by the vapor phase reaction of sulfur with methane in a reaction zone in the presence of a solid catalyst selected from the group consisting of silica gel, silica-alumina, alumina, activated alumina, floridin, bauxite, and activated bauxite at a temperature of 425° C. to 700° C., which comprises supplying the catalyst to a combustion zone, burning a combustible sulfur-containing material in an oxygen-containing gas in a combustion zone whereby sulfur is produced and whereby heat is generated and imparted to the catalyst in the combustion zone, passing vaporized sulfur to the reaction zone, passing methane to the reaction zone, circulating sufficient hot catalyst from the combustion zone to the reaction zone in the absence of any non- catalytic heat carrying solid to supply the necessary heat of the reaction, and recovering carbon disulfide from the reaction zone.

7. A process according to claim 6 in which the catalyst employed is silica gel.

8. A process according to claim 6 in which the catalyst employed is alumina.

9. A process according to claim 6 in which the catalyst employed is activated bauxite.

10. A process for the preparation of carbon disulfide by the vapor phase reaction of sulfur with a hydrocarbon in a reaction zone in the presence of a solid catalyst at a temperature of 425° C. to 1000° C., which comprises supplying the catalyst to a combustion zone, burning a combustible sulfur-producing material in an oxygen-containing gas in the combustion zone whereby sulfur is produced and whereby heat is generated and imparted to the catalyst in the combustion zone, passing a stream comprising sulfur vapor and a hydrocarbon into countercurrent contact with the thus heated catalyst in said reaction zone by circulating sufficient hot catalyst from the combustion zone to the reaction zone in the absence of any non-catalytic heat carrying solid to supply the necessary heat of the reaction, and recovering carbon disulfide from the reaction zone.

11. A process for the preparation of carbon disulfide by the vapor phase reaction of sulfur with methane in a reaction zone in the presence of a solid catalyst at a temperature of 425° C. to 1000° C., which comprises supplying the catalyst to a combustion zone, burning hydrogen sulfide with air in the combustion zone whereby sulfur is produced and whereby heat is generated and imparted to the catalyst in the combustion zone, passing vaporized sulfur to the reaction zone, passing methane to the reaction zone, circulating hot catalyst from the combustion zone to the reaction zone in the absence of any non-catalytic heat carrying solid to supply the necessary heat for reaction between the sulfur and the methane, recovering carbon disulfide from the reaction zone, removing spent catalyst from the reaction zone to the combustion zone, regenerating and reheating the spent catalyst in the combustion zone during the reaction between hydrogen sulfide and air and returning the regenerated hot catalyst from the combustion zone to the reaction zone.

WILLIAM W. ODELL.
CHARLES E. MORRELL.
HAROLD W. SCHEELINE.

References Cited in the file of this patent

UNITED STATES PATENTS

| Number | Name | Date |
| --- | --- | --- |
| 2,330,934 | Thacker | Oct. 5, 1943 |
| 2,386,202 | Fernelius et al. | Oct. 9, 1945 |
| 2,389,810 | Odell | Nov. 27, 1945 |
| 2,432,520 | Ferro | Dec. 16, 1947 |
| 2,508,292 | Porter et al. | May 16, 1950 |

FOREIGN PATENTS

| Number | Country | Date |
| --- | --- | --- |
| 261,990 | Great Britain | Dec. 2, 1926 |

OTHER REFERENCES

Sachanen: "Conversion of Petroleum," 2nd edition, 1948, page 315.